(12) United States Patent
Nuzman et al.

(10) Patent No.: US 9,379,770 B2
(45) Date of Patent: Jun. 28, 2016

(54) METHODS AND SYSTEMS FOR ACTIVATING AND DEACTIVATING COMMUNICATION PATHS

(71) Applicant: Alcatel-Lucent, Paris (FR)

(72) Inventors: Carl Nuzman, Union, NJ (US); Thomas J. G. Mermans, Ghent (BE); Dirk Vanderhaegen, Wemmel (BE)

(73) Assignee: Alcatel Lucent, Boulogne-Billancourt (FR)

( * ) Notice: Subject to any disclaimer, the term of this patent is extended or adjusted under 35 U.S.C. 154(b) by 343 days.

(21) Appl. No.: 14/013,476

(22) Filed: Aug. 29, 2013

(65) Prior Publication Data

US 2015/0063560 A1 Mar. 5, 2015

(51) Int. Cl.
*H04M 9/08* (2006.01)
*H04B 3/32* (2006.01)
*H04M 11/06* (2006.01)

(52) U.S. Cl.
CPC ............... *H04B 3/32* (2013.01); *H04M 11/062* (2013.01)

(58) Field of Classification Search
CPC ........................................................ H04B 3/32
See application file for complete search history.

(56) References Cited

U.S. PATENT DOCUMENTS

| | | | | |
|---|---|---|---|---|
| 2003/0236904 A1* | 12/2003 | Walpole | .............. | H04L 12/1881 709/231 |
| 2009/0092036 A1* | 4/2009 | Peeters | .................... | H04B 3/32 370/201 |
| 2010/0195816 A1* | 8/2010 | Ahrndt | .................... | H04B 3/32 379/406.06 |
| 2010/0202554 A1* | 8/2010 | Kramer | ............... | H04L 25/0224 375/285 |
| 2010/0329386 A1* | 12/2010 | De Lind Van Wijngaarden | ............ | H04B 3/32 375/296 |
| 2012/0195183 A1* | 8/2012 | Nuzman | .............. | H04B 7/0848 370/201 |

FOREIGN PATENT DOCUMENTS

| | | | |
|---|---|---|---|
| EP | 1936825 A1 | 6/2008 | |
| WO | WO-2012171201 A1 | 12/2012 | |

OTHER PUBLICATIONS

"Self-FEXT cancellation (vectoring) for use with VDSL2 transceivers", International Telecommunication Union, ITU-T G.993.5,, Telecommunication Standardization Sector of ITU, Series G: Transmission Systems and Media, Digital Systems and Networks, Digital sections and digital line system—Access networks, Recommendation ITU-T G.993.5, Apr. 2010.
International Search Report and Written Opinion dated Feb. 6, 2015.

* cited by examiner

*Primary Examiner* — Joseph T Phan
(74) *Attorney, Agent, or Firm* — Harness, Dickey & Pierce, P.L.C.

(57) ABSTRACT

At least one example embodiment discloses a method of initializing a plurality of communication paths in a system. The method includes obtaining a first matrix from a storage medium, the first matrix including at least one channel sub-matrix of the system associated with a subset of the plurality of communication paths, obtaining an indication of which communication paths are to become active and determining, after the obtaining the indication, new compensation coefficients based on the at least one channel sub-matrix and active compensation coefficients, the active compensation coefficients for compensating for crosstalk between the active communication paths prior to the number of active communication paths changing.

26 Claims, 11 Drawing Sheets

|     | $I+E$ | | $H=I+G$ | | $C=I+\Omega$ | |
|-----|-------|-|---------|-|--------------|-|
| (1) | $I+E_{RR}$ \| $0$ <br> $E_{JR}$ \| $0$ | = | $I+G_{RR}$ \| $G_{RJ}$ <br> $G_{JR}$ \| $I+G_{JJ}$ | | $I+\Omega_{RR}$ \| $0$ <br> $0$ \| $0$ | |
| (2) | $I+E_{RR}$ \| $E_{RJ}$ <br> $E_{JR}$ \| $I+E_{JJ}$ | = | $I+G_{RR}$ \| $G_{RJ}$ <br> $G_{JR}$ \| $I+G_{JJ}$ | | $I+\Omega_{RR}$ \| $0$ <br> $0$ \| $I$ | |
| (3) | $I+E_{RR}$ \| $E_{RJ}$ <br> $E_{JR}$ \| $I+E_{JJ}$ | = | $I+G_{RR}$ \| $G_{RJ}$ <br> $G_{JR}$ \| $I+G_{JJ}$ | | $I+\Omega_{RR}$ \| $\Omega_{RJ}$ <br> $0$ \| $I$ | |

$$
\begin{array}{c}
\quad I+E \quad\quad\quad\quad H=I+G \quad\quad\quad\quad C=I+\Omega \\
(4) \quad \begin{bmatrix} I+E_{RR} & E_{RJ} \\ E_{JR} & I+E_{JJ} \end{bmatrix} = \begin{bmatrix} I+G_{RR} & G_{RJ} \\ G_{JR} & I+G_{JJ} \end{bmatrix} \begin{bmatrix} I+\Omega_{RR} & \Omega'_{RJ} \\ 0 & I \end{bmatrix}
\end{array}
$$

$$
(5) \quad \begin{bmatrix} I+E_{RR} & E_{RJ} \\ E_{JR} & I+E_{JJ} \end{bmatrix} = \begin{bmatrix} I+G_{RR} & G_{RJ} \\ G_{JR} & I+G_{JJ} \end{bmatrix} \begin{bmatrix} I+\Omega_{RR} & \Omega''_{RJ} \\ 0 & I+\Omega'_{JJ} \end{bmatrix}
$$

$$
(6) \quad \begin{bmatrix} I+E_{RR} & E_{RJ} \\ E_{JR} & I+E_{JJ} \end{bmatrix} = \begin{bmatrix} I+G_{RR} & G_{RJ} \\ G_{JR} & I+G_{JJ} \end{bmatrix} \begin{bmatrix} I+\Omega'_{RR} & \Omega''_{RJ} \\ \Omega'_{JR} & I+\Omega'_{JJ} \end{bmatrix}
$$

*FIG. 6B*

METHODS AND SYSTEMS FOR ACTIVATING AND DEACTIVATING COMMUNICATION PATHS

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two VDSL2 lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Each communication line is a possible disturber line which induces crosstalk in one or more victim lines. Moreover, in today's systems, the number of active communication lines may vary. Thus, the induced crosstalk varies as the number of active communication lines vary.

By transmitting test signals across all the lines, it is possible to determine the influence of each disturber line on the victim lines. The test signals can be characterized by the way in which power is allocated to one or more tones or frequencies. For instance, a test signal may be transmitted using a particular power level over a small frequency range. The victim line may notice this power in that frequency range and be able to determine the amplitude of that power. The amplitude of the induced influence of crosstalk on a particular line is a good reference to determine how strong particular crosstalk disturbers are into that victim or which frequencies or tones are susceptible to the crosstalk of certain crosstalk disturbers into that victim.

Precoding (also referred to as precompensation) techniques are based on transmitting an additional signal added to the data signal which is used to compensate the crosstalk on a victim line from external sources. Thus, instead of reducing the effect of crosstalk or avoiding crosstalk effects by configuring the communication line in an appropriate way, precoding can be used to compensate for the effects of crosstalk on a communication channel. Precoding techniques are based on crosstalk channel information that includes both amplitude and phase information. Such information can be obtained by processing measurements such as slicer error or signal-to-noise ratio (SNR).

A particular example of such measurements for precoding is the use of pilot sequences and error feedback. The use of pilot sequences in G.vector is described in "Self-FEXT cancellation (vectoring) for use with VDSL2 transceivers," *Series G: Transmission Systems and Media, Digital Systems and Networks, ITU G.993.5*, April 2010, the entire contents of which is incorporated by reference.

Initialization of a vectored DSL session generally uses an estimation process to estimate crosstalk channel coupling between activating lines and already active lines.

SUMMARY

Example embodiments are directed to methods and systems for activating and deactivating communication paths. For example, example embodiments disclose methods and systems for activating and deactivating DSL lines.

In at least one example embodiment, a historical channel matrix is stored, rather than a historical precoder, because the channel matrix does not depend on the set of active lines. Because a historical channel matrix is stored, the number of calculations to determine precoder coefficients when a number of active lines changes is reduced.

Information from the historical channel matrix may be combined with information in the active precoder to obtain new precoder coefficients without estimation, and without explicit matrix inversion. The historical channel matrix may be updated based on information contained in the active precoder.

Channel coefficients corresponding to the inactive lines and precoder coefficients corresponding to the active lines may be maintained. All coefficients can be stored in a single array, of the same size as the precoder matrix when all lines are active.

At least one example embodiment discloses a method of initializing a plurality of communication paths in a system. The method includes obtaining a first matrix from a storage medium, the first matrix including at least one channel sub-matrix of the system associated with a subset of the plurality of communication paths, obtaining an indication of which communication paths are to become active and determining, after the obtaining the indication, new compensation coefficients based on the at least one channel sub-matrix and active compensation coefficients, the active compensation coefficients for compensating for crosstalk between the active communication paths prior to the number of active communication paths changing.

In an example embodiment, the at least one channel sub-matrix includes channel coefficients corresponding to inactive communication paths before the obtaining.

In an example embodiment, the first matrix further includes a compensation sub-matrix, the compensation sub-matrix including the active compensation coefficients.

In an example embodiment, the first matrix only includes the compensation sub-matrix having rows and columns associated with subsets of active communication paths before the obtaining and channel sub-matrices having rows and/or columns associated with subsets of inactive communication paths before the obtaining.

In an example embodiment, the active compensation coefficients correspond to active communication paths.

In an example embodiment, the method further includes updating the at least one channel sub-matrix.

In an example embodiment, the method further includes obtaining a second matrix before the determining if the number of active communication paths changes, the second matrix including a compensation sub-matrix, the compensation sub-matrix including the active compensation coefficients.

In an example embodiment, the first matrix includes a plurality of channel sub-matrices associated with subsets of the plurality of communication paths.

In an example embodiment, the method further includes maintaining the first matrix when the number of active communication paths in the system changes.

In an example embodiment, the method further includes transmitting data using the new compensation coefficients.

At least one example embodiment discloses a method of deactivating a plurality of communication paths in a system. The method includes obtaining a first matrix from a storage medium, the first matrix including active compensation sub-matrices associated with at least first and second subsets of active communication paths in the system, the active compensation sub-matrices representing compensation coefficients for compensating for crosstalk in the system, obtaining an indication of which communication paths are to become inactive and determining, after the obtaining the indication, new compensation coefficients and a plurality of channel sub-matrices of the system based on the active compensation sub-matrices.

In an example embodiment, the method further includes deactivating the second subset of communication paths.

In an example embodiment, the determining includes determining the new compensation coefficients and the plurality of channel sub-matrices as:

$$\Omega_{RR}' \approx \Omega_{RR} - \Omega_{RD}(1+\Omega_{DD})^{-1}\Omega_{DR}$$

$$G_{DD,stor} = (I+\Omega_{DD} - \Omega_{DR}(I+\Omega_{RR})^{-1}\Omega_{RD})^{-1} - I$$

$$G_{DR,stor} = -(I+\Omega_{DD})^{-1}\Omega_{DR}(I+\Omega_{RR} - \Omega_{RD}(I+\Omega_{DD})^{-1}\Omega_{DR})^{-1}$$

$$G_{RD,stor} = -(I+\Omega_{RR})^{-1}\Omega_{RD}(I+\Omega_{DD} - \Omega_{DR}(I+\Omega_{RR})^{-1}\Omega_{RD})^{-1}$$

wherein R is the first subset and D is the second subset, $G_{DD,stor}$, $G_{DR,stor}$ and $G_{RD,stor}$ are stored estimates of channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

In an example embodiment, the determining includes determining the new compensation coefficients and the plurality of channel sub-matrices as:

$$\Omega_{RR}' = \Omega_{RR} - \Omega_{RD}(I-\Omega_{DD})\Omega_{DR}$$

$$G_{DD,stor} = -\Omega_{DD} + \Omega_{DR}(I-\Omega_{RR})\Omega_{RD}$$

$$G_{DR,stor} = -(I-\Omega_{DD})\Omega_{DR}(I-\Omega_{RR} + \Omega_{RD}(I-\Omega_{DD})\Omega_{DR})$$

$$G_{RD,stor} = -(I-\Omega_{RR})\Omega_{RD}(I-\Omega_{DD} + \Omega_{DR}(I-\Omega_{RR})\Omega_{RD})$$

wherein R is the first subset and D is the second subset, $G_{DD,stor}$, $G_{DR,stor}$ and $G_{RD,stor}$ are stored estimates of channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

In an example embodiment, the method further includes transmitting data using the new compensation coefficients.

At least one example embodiment discloses a system having a plurality of communication paths. The system includes a memory configured to store a first matrix, the first matrix including at least one channel sub-matrix of the system associated with a subset of the plurality of communication paths and a processor, the processor configured to obtain an indication of which communication paths are to become active and determine, after obtaining the indication, new compensation coefficients based on the stored at least one channel sub-matrix and active compensation coefficients, the active compensation coefficients for compensating for crosstalk between the active communication paths prior to the number of active communication paths changing.

In an example embodiment, the at least one channel sub-matrix includes channel coefficients having rows and/or columns corresponding to inactive communication paths before obtaining the indication.

In an example embodiment, the first matrix further includes a compensation sub-matrix, the compensation sub-matrix including the active compensation coefficients.

In an example embodiment, the first matrix only includes the compensation sub-matrix having rows and columns associated with subsets of active communication paths before obtaining the indication and channel sub-matrices having rows and/or columns associated with subsets of inactive communication paths before obtaining the indication.

In an example embodiment, the active compensation coefficients correspond to active communication paths.

In an example embodiment, the processor is configured to update the at least one channel sub-matrix.

In an example embodiment, the memory is configured to store a second matrix, the second matrix including a compensation sub-matrix, the compensation sub-matrix including the active compensation coefficients.

In an example embodiment, the first matrix includes a plurality of channel sub-matrices associated with subsets of the plurality of communication paths.

In an example embodiment, the memory is configured to maintain the first matrix when the number of active communication paths in the system changes.

At least one example embodiment discloses a system having a plurality of communication paths. The system includes a memory configured to store a first matrix, the first matrix including active compensation sub-matrices associated with at least first and second subsets of active communication paths in the system, the active compensation sub-matrices representing compensation coefficients for compensating for crosstalk in the system and a processor configured to obtain an indication of which communication paths are to become inactive and determine, after obtaining the indication, new compensation coefficients and a plurality of channel sub-matrices of the system based on the stored active compensation sub-matrices.

In an example embodiment, the processor is configured to deactivate the second subset of communication paths.

In an example embodiment, the processor is configured to determine the new compensation coefficients and the plurality of channel sub-matrices as:

$$\Omega_{RR}' \approx \Omega_{RR} - \Omega_{RD}(1+\Omega_{DD})^{-1}\Omega_{DR}$$

$$G_{DD,stor} = (I+\Omega_{DD} - \Omega_{DR}(I+\Omega_{RR})^{-1}\Omega_{RD})^{-1} - I$$

$$G_{DR,stor} = -(I+\Omega_{DD})^{-1}\Omega_{DR}(I+\Omega_{RR} - \Omega_{RD}(I+\Omega_{DD})^{-1}\Omega_{DR})^{-1}$$

$$G_{RD,stor} = -(I+\Omega_{RR})^{-1}\Omega_{RD}(I+\Omega_{DD} - \Omega_{DR}(I+\Omega_{RR})^{-1}\Omega_{RD})^{-1}$$

wherein R is the first subset and D is the second subset, $G_{DD,stor}$, $G_{DR,stor}$ and $G_{RD,stor}$ are stored estimates of channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

In an example embodiment, the processor is configured to determine the new compensation coefficients and the plurality of channel sub-matrices as:

$$\Omega_{RR}' = \Omega_{RR} - \Omega_{RD}(I-\Omega_{DD})\Omega_{DR}$$

$$G_{DD,stor} = -\Omega_{DD} + \Omega_{DR}(I-\Omega_{RR})\Omega_{RD}$$

$$G_{DR,stor} = -(I-\Omega_{DD})\Omega_{DR}(I-\Omega_{RR} + \Omega_{RD}(I-\Omega_{DD})\Omega_{DR})$$

$$G_{RD,stor} = -(I-\Omega_{RR})\Omega_{RD}(I-\Omega_{DD} + \Omega_{DR}(I-\Omega_{RR})\Omega_{RD})$$

wherein R is the first subset and D is the second subset, $G_{DD,stor}$, $G_{DR,stor}$ and $G_{RD,stor}$ are stored estimates of channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

BRIEF DESCRIPTION OF THE DRAWINGS

Example embodiments will be more clearly understood from the following detailed description taken in conjunction with the accompanying drawings. FIGS. 1-9 represent non-limiting, example embodiments as described herein.

FIG. 1 illustrates a conventional DSL system;

FIG. 2 illustrates a system for vectoring (crosstalk cancellation);

FIG. 3 illustrates a controller of FIG. 2 including a precoder according to an example embodiment;

FIG. 4 illustrates a method of initializing a subset of communication paths in a system according to an example embodiment;

FIGS. 5A-5B illustrate an example embodiment of determining new compensation coefficients;

FIGS. 6A-6B illustrate an example embodiment of determining new compensation coefficients;

FIG. 7 illustrates a method of deactivating a subset of communication paths in a system according to an example embodiment;

FIG. 8 illustrates the controller of FIG. 2 including a postcoder according to an example embodiment; and FIG. 9 illustrates a method of determining postcoder coefficients according to an example embodiment.

DETAILED DESCRIPTION

Figure 1:
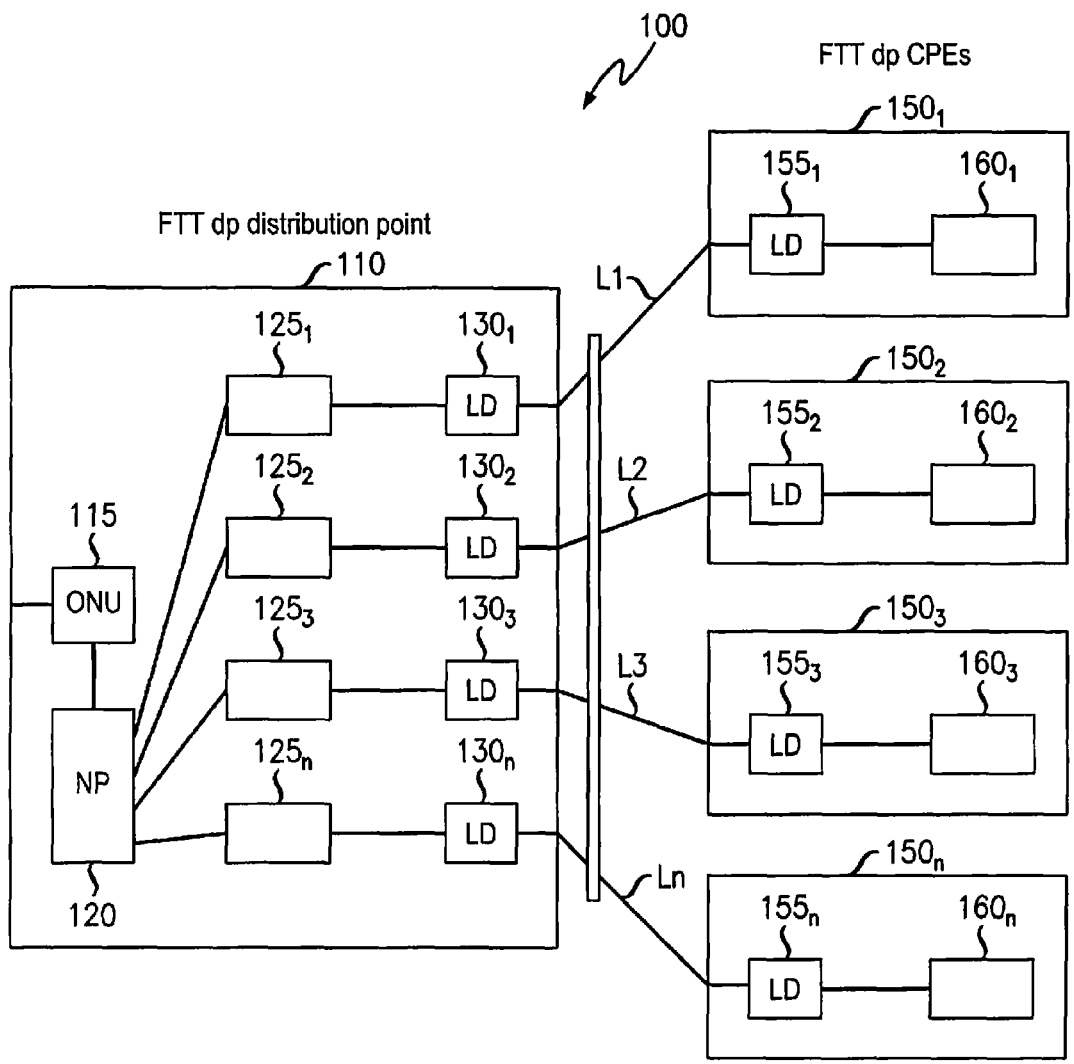

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors or controllers.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

FIG. 1 illustrates a conventional DSL system. As shown, a system 100 includes an access node 110 and Customer Premises Equipment (CPEs) $150_1$-$150_n$. In some example embodiments, the access node 110 may be a DSLAM (digital subscriber line access multiplexer). In other example embodiments, the access node 110 may include an individual optical network unit (ONU) associated with each user, and four optical fibers connected. The multiplexing of the four users into a single line would occur in the fiber optics part of the network. Each of the CPEs $150_1$-$150_n$ may be in a separate home or office with its own CPE, for example. Moreover, each of the CPEs $150_1$-$150_n$ may transmit and receive data, and therefore, may be referred to as transceivers.

The system 100 may be a DSL system, VDSL system or a VDSL2 system, for example.

The access node 110 may be under control of an operator. The access node 110 includes an ONU 115 configured to communicate with a network processor (NP) 120. As is known, the ONU 115 provides a high-bandwidth data connection over a fiber optic channel to an optical line terminal (OLT) located in a central office. The ONU passes received downstream data frames or packets to the NP 120, which then determines the destination for the frames or packets and accordingly forwards them to an appropriate DSL interface. Similarly, in the upstream direction, the NP 120 forwards frames or packets from the DSL interfaces to the ONU 115.

The NP 120 provides signals to processing devices $125_1$-$125_n$, each having one or more processors. Each of the processing devices $125_1$-$125_n$ provides a DSL interface. While the number of processing devices $125_1$-$125_n$ shown is four, the number of processing devices $125_1$-$125_n$ may be greater than or less than four. The processing devices $125_1$-$125_n$ may be physical layer single-input-single-output (SISO) processing devices.

Each of the processing devices $125_1$-$125_n$ may communicate with one of the CPEs $150_1$-$150_n$ over communication lines L1-Ln through an associated line driver (LD) $130_1$-$130_n$. The communication lines L1-Ln may be twisted line pairs that carry electromagnetic signals. As should be understood, the communications are not limited to twisted line pairs. The system 100 may communicate using DSL signals, VDSL signals, and Ethernet signals, for example. Each pair of processing devices $125_1$-$125_n$ and associated LDs $130_1$-$130_n$ may transmit and receive data, and therefore, may be referred to as transceivers.

The processing devices $125_1$-$125_n$ modulate the data, generating a time-domain digital signal to the LDs $130_1$-$130_n$ consisting of a sampled sequence of values to transmit. The LDs $130_1$-$130_n$ then convert the digital signal to analog form, amplify it, and transmit the analog signal over the communication lines L1-Ln, respectively, to the CPEs $150_1$-$150_n$, respectively.

FIG. 1 shows a total of four communication lines connected to the access node 110. However, a distribution point may be connected to a larger number of lines than four. In addition, a precoding group may not be limited to the lines connected to a single distribution point. A precoding group may for instance contain several tens of lines which are distributed over a number of distribution points. In such case, coordination between distribution points may be required. FIG. 1 furthermore only shows the elements in the communication network which are relevant for the understanding of example embodiments. Therefore, elements such as network equipment to which the distribution point is connected, links connecting the distribution point to such equipment, intermediary devices, etc., are not shown in this figure.

While the number of CPEs $150_1$-$150_n$ shown is four, the number of CPEs $150_1$-$150_n$ may be greater than or less than four. Each of the CPEs $150_1$-$150_n$ includes an associated line driver $155_1$-$155_n$ and processing device $160_1$-$160_n$, each having one or more processors.

The processing devices $160_1$-$160_n$ may be the same or substantially the same as the processing devices $125_1$-$125_n$ and, therefore, will not be described in greater detail for the sake of brevity.

The communication lines L1-Ln may extend from the access node 110 to the CPEs $150_1$-$150_n$, respectively.

However, the system 100 may be subject to crosstalk if the lines L1-Ln are not sufficiently physically separated.

More specifically, any one of the lines L1-Ln may be considered a victim line and the remaining lines L1-Ln may be considered disturber lines. Each of the lines L1-Ln may be associated with a customer. For the sake of clarity and brevity, L1 will be described as the victim line.

Near end crosstalk (NEXT) is the coupling that occurs between a transmitted signal at one side of a disturber line, for example, the communication lines L2-Ln, and a signal at a transceiver (not shown) at the same end of the victim line L1. For example, coupling between signals transmitted from the LD $130_2$ into the receiver at the LD $130_1$ is near-end crosstalk.

Contrary to NEXT, far end crosstalk (FEXT) occurs, for example, when signals sent from the access node 110 into the disturber lines L2-Ln couple into victim line L1 and cause interference to the receiver at CPE $150_1$, or signals sent from the CPEs $150_2$-$150_n$ into the disturber lines L2-Ln couple into victim line L1 and cause interference to the receiver at LD $130_1$.

In the system 100, data rates could be impacted by crosstalk interference between the communication lines L1-Ln.

To avoid crosstalk interference, a scheduler may be added to the access node 110. The scheduler allows one subscriber to transmit at a time. An interface is defined between the processing devices $125_1$-$125_n$ and the scheduler. In this way, each user can achieve high peak rates without being affected by crosstalk.

However, when using scheduling, the communication lines L1-Ln become a shared medium, and the average data rates are inversely proportional to the number of active lines. With a scheduler, there is only one active line at a time.

To improve performance, vectoring can be used. Vectoring is also referred to crosstalk cancellation. Crosstalk cancellation improves data rates and allows simultaneous communication over multiple lines, instead of scheduling. Crosstalk cancellation in VDSL2 is described in ITU G.993.5, "Self-FEXT cancellation (vectoring) for use with VDSL2 transceivers," *Series G: Transmission Systems and Media, Digital Systems and Networks, ITU G*.993.5, April 2010, also known as the G.vector recommendation.

Figure 2:
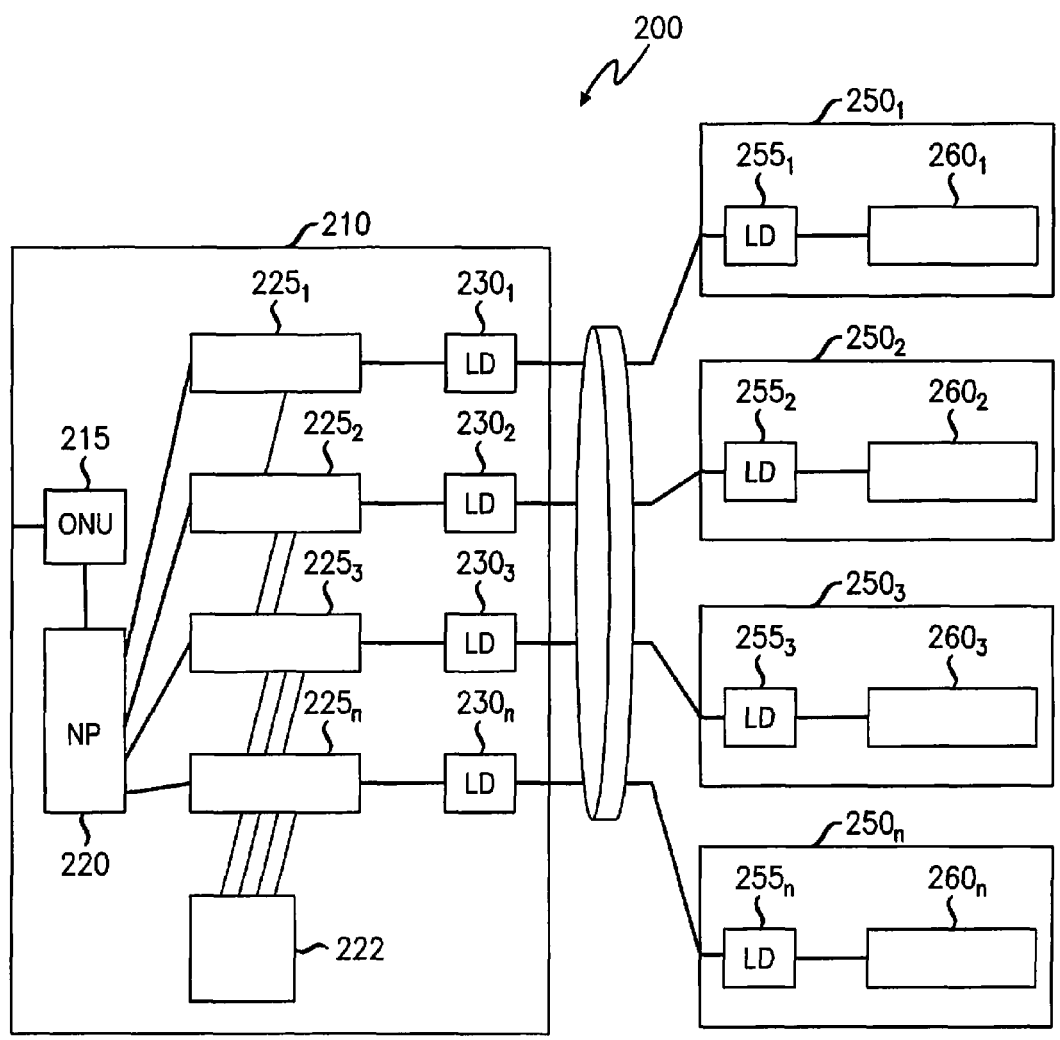

FIG. 2 illustrates a system for vectoring (crosstalk cancellation). As shown in FIG. 2, a system 200 includes a distribution point 210 and Customer Premises Equipment (CPEs) $250_1$-$250_n$.

In the system 200, the techniques defined in G.vector are used to mitigate crosstalk between active lines. The distribution point 210 may be under control of an operator. The distribution point 210 includes an optical network unit (ONU) 215 configured to communicate with an NP 220. The ONU 215 and the NP 220 are the same as the ONU 115 and the NP 120, respectively, and therefore, will not be described in greater detail.

The NP 220 provides signals to processing devices $225_1$-$225_n$, each having one or more processor. While the number of processing devices $225_1$-$225_n$ shown is four, the number of processing devices $225_1$-$225_n$ may be greater than or less than four. The processing devices $225_1$-$225_n$ are adapted for point-to-point communication.

The distribution point 210 further includes a controller 222. The controller 222 may include a precoder according to example embodiments, as will be described in further detail below. The controller 222 is configured to receive signal data from the processing devices $225_1$-$225_n$. The signal data may include signal values intended to be received by corresponding processing devices $260_1$-$265_n$. The controller is also configured to send pre-compensated symbol data back to the processing devices $225_1$-$225_n$. Generally, the data exchanged between processing devices $225_1$-$225_n$ would be frequency-domain samples, but alternatively the data could be represented as time-domain samples, for example.

The controller 222 communicates with the processing devices $225_1$-$225_n$. Alternatively, the controller 222 may be between the processing devices $225_1$-$225_n$ and the line drivers $230_1$-$230_n$. Thus, the location of the controller 222 is not limited to the location shown in FIG. 2.

More specifically, in the downstream direction, the controller 222 receives signal data from the processing devices $225_1$-$225_n$, applies precoder coefficients to precompensate the signal data against crosstalk, and provides the processing devices $225_1$-$225_n$ with the precompensated signal data.

In the upstream direction, the processing devices $225_1$-$225_n$ receive crosstalk-contaminated signals from the line drivers $230_1$-$230_n$. The controller 222 receives crosstalk-contaminated signals from the processing devices $225_1$-$225_n$, applies crosstalk filter coefficients to post-compensate the received signals for crosstalk, and provides the processing devices $225_1$-$225_n$ with the post-compensated signal data. The processing devices $225_1$-$225_n$ then continue to process the signal data to demodulate the intended upstream information.

Each of the CPEs $250_1$-$250_n$ includes a line driver $255_1$-$255_n$ and a processing device $260_1$-$260_n$. Each of the line drivers $255_1$-$255_n$ may be the same or substantially the same as the line drivers (LD) $230_1$-$230_n$.

Discussion of Conventional Art

Initialization of a vectored DSL session generally uses an estimation process to estimate crosstalk channel coupling between activating lines and already active lines.

Conventionally, a historical precoder is used when a line deactivates. When a DSL line deactivates, the precoder coefficients the DSL line has used are kept in memory, to be re-used the next time that the line activates. Theoretically, the use of historical coefficients can make it unnecessary to repeat the crosstalk estimation process beginning with the second time a line initializes.

However, the precoder coefficients are not just the negative values to the channel coefficients—they are the coefficients of the inverse of the active submatrix of the channel coefficients. On systems with small crosstalk, the coefficients are approximately the negative values of the channel coefficients and do not depend strongly on which subset of lines is active, in which case a conventional historical precoder can be effective. By contrast, on systems with larger crosstalk, the coefficients depend significantly on which subset of lines is active, so which active submatrix is to be inverted. If a line activates twice, with different lines being active each time, then different coefficients will be needed, due to effects of second-order and higher. In other words, by simply using previous precoder coefficients, the DSL line will initialize with second-order residual crosstalk terms.

G.vector provides a conventional initialization process. The G.vector initialization process uses error feedback to estimate submatrices of a residual crosstalk channel.

As an example, the method of U.S. Patent Application Publication No. 2012/0195183, filed on Jan. 28, 2011, can be used to update the compensation matrices, based on estimated residual crosstalk channel submatrices, with a multiplicative technique to avoid crosstalk transients, the entire contents of which are incorporated by reference. The process of sending and collecting error feedback takes a significant amount of time. Additionally, the computations required to process the error feedback to form estimates of the residual crosstalk channel can also be time consuming. Consequently, the initialization process based on estimating the residual crosstalk channel can take a long time to execute.

By contrast, at least example embodiment discloses skipping an estimation step by using a historical channel matrix.

The residual crosstalk is the crosstalk left over on the active lines after vectoring has been applied. After determining a precoder matrix and using it, there is generally some small residual crosstalk that can be estimated. Therefore, the precoder matrix is updated to further reduce the residual crosstalk.

The term feedback refers to a means by which the transceiver of a communication system such as a CPE communicates to a transceiver of the communication system such as a distribution point values derived from received pilot signals.

Discussion of Activation and Deactivation According to Example Embodiments

Figure 3:
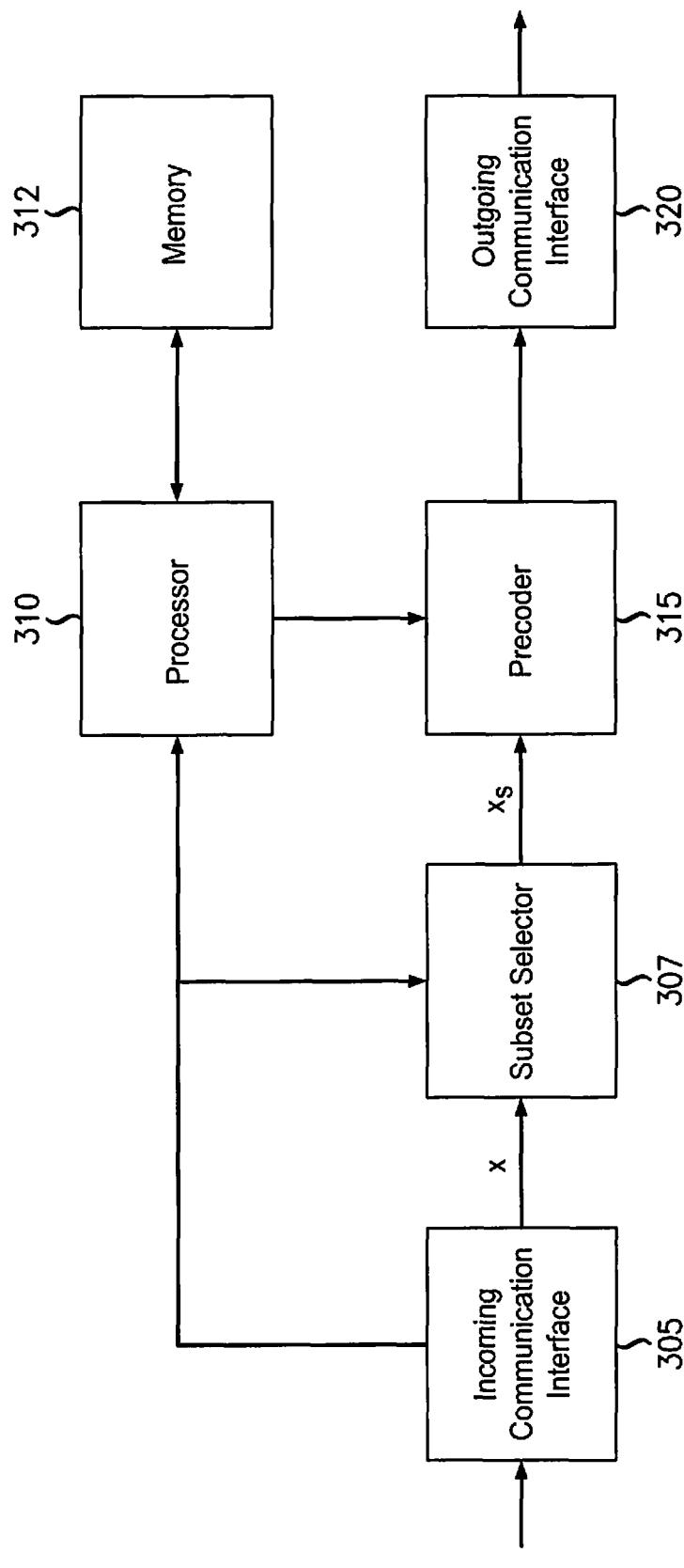

FIG. 3 illustrates the controller 222 including a precoder according to an example embodiment. The controller 222 has a communication interface 305 with each of the processing devices $225_1$-$225_n$. The incoming communication interface 305 receives data and control signals from the processing devices $225_1$-$225_n$. The incoming communication interface 305 forwards symbol data X to a subset selector 307. The incoming communication interface 305 also forwards information about which lines are active to the subset selector 307 and to a processor 310. The processor 310 is configured to store to and retrieve data from a memory (storage medium) 312, such as a historical channel matrix. The memory 312 may include one or more memory modules. The memory modules may be separate physical memories (e.g., hard drives), separate partitions on a single physical memory and/or separate storage locations on a single partition of a single physical memory.

The incoming communication interface 305, subset selector 307, processor 310, precoder 315 and outgoing communication interface 320 may be implemented in hardware, software or firmware, for example. If either one of the incoming communication interface 305, subset selector 307, processor 310, precoder 315 and outgoing communication interface 320 is software, a controller such as the controller 222 is specifically programmed to execute the software.

During a DSL session, an active line sends a constant stream of data (either real user data or random "place-holder" data).

The subset selector 307 forwards symbol data Xs corresponding to the subset of active lines to a precoder 315. The precoder 315 applies coefficients received from the processor 310 to the symbol data received from the subset selector 307 to produce compensated data symbols (precoded data), which are forwarded to an outgoing communication interface 320.

The outgoing communication interface 320 sends the compensated data symbols to the processing devices $225_1$-$225_n$.

The memory 312 may store an estimate of the normalized crosstalk channel H (direct gains removed), which is:

$$H = (I+G) \quad (1)$$

where G is a relative crosstalk matrix and I is an identity matrix. The full relative crosstalk matrix G may be estimated by any known means such as transmitting, during a training phase, a plurality of pilot signals on all communication paths and using feedback signals from all communication paths to estimate the crosstalk channel. The stored estimate will be denoted $G_{stor}$, as distinct from the matrix G representing the true physical channel.

Alternatively, the stored relative crosstalk matrix may be built up gradually over time as different communication paths become active. For example, coefficients $G_{mk}$ and $G_{km}$, for communication paths m and k, can be estimated using feedback signals at the first estimation opportunity in which communication paths m and k are both active.

If all N lines are active, then the precoder 315 implements a matrix C, which ideally should be the inverse of the normalized crosstalk channel H:

$$C = (I+G)^{-1} \quad (2)$$

The processor 310 is configured to determine a precompensation matrix $\Omega$ and store the precompensation matrix $\Omega$ in the memory 312. The precompensation matrix is:

$$\Omega = C - I \quad (3)$$

If A and B are subsets of lines, then $G_{AB}$ may be denoted as the submatrix of G corresponding to rows in the set A and columns in the set B, and similarly for other matrices and subsets.

For a set of active lines S, the active channel submatrix is denoted as $G_{SS}$, and the corresponding submatrix of the precoder is ideally:

$$C_{SS} = (I+G_{SS})^{-1} \quad (4)$$

If T is a set of inactive lines, then remaining submatrices of the precompensation matrix, $\Omega_{ST}$, $\Omega_{TS}$, and $\Omega_{TT}$, can be zero.

In one embodiment, the memory 312 may store two arrays. The memory 312 stores the channel matrix $G_{stor}$ in one array, and stores the current precoder C in another array. The processor 310 determines $G_{stor}$ values during the first time various pairs of lines are both active, as described previously.

On subsequent initializations, the G values are taken from the stored array, rather than measured.

In another embodiment, the memory 312 stores a single combined channel/compensation matrix array A. In a submatrix associated with active lines the current compensation matrix is stored:

$$A_{SS} = \Omega_{SS} \approx (I+G_{SS})^{-1} - I \quad (5)$$

In the remaining sub-matrices of A, the memory 312 stores an estimate of the corresponding submatrices of the channel matrix. In other words, the memory 312 stores the corresponding submatrices as $A_{ST} = G_{ST,stor}$, $A_{TS} = G_{TS,stor}$, and $A_{TT} = G_{TT,stor}$.

Activation

Figure 4:
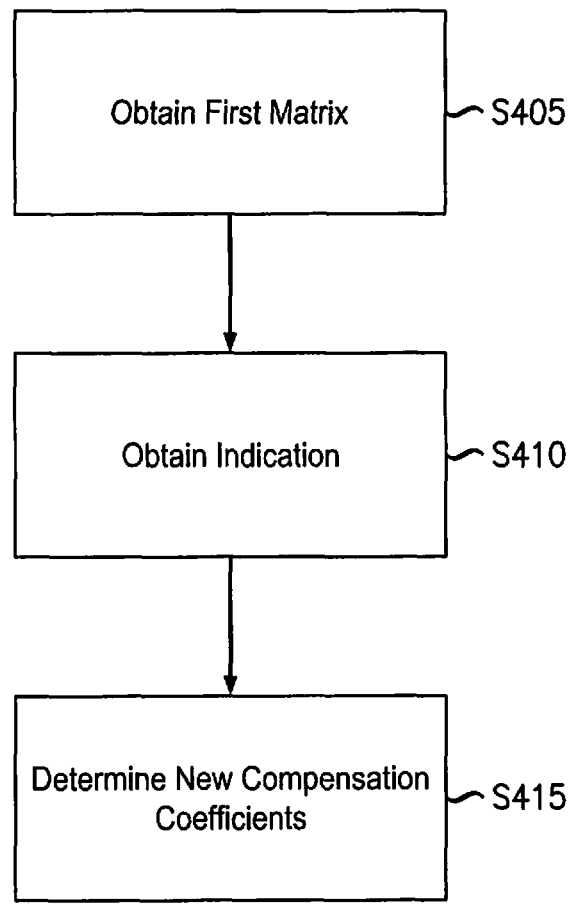

FIG. 4 illustrates a method of initializing a subset of communication paths in a system. To aid in the description of the method of FIG. 4, FIG. 3 is used. However, it should be understood that the method of FIG. 4 may be performed by controllers and precoders different that those described in FIG. 3.

N lines are divided into subsets of lines. For example, there is the subset S of active lines, and the subset T of inactive lines.

At S405, the system obtains a first matrix. For example, the memory 312 stores an estimated channel matrix $G_{stor}$ and compensation matrix $\Omega$. In this example, the channel matrix $G_{stor}$ may be referred to as the first matrix. The channel matrix includes an estimate of the channel matrix G and the compensation matrix $\Omega$ includes the compensation coefficients associated with the current active lines. For example, in a system with two subsets of lines, S and T, the stored channel matrix $G_{stor}$ would be an N×N matrix with a 2×2 block structure comprising channel sub-matrices $G_{SS,stor}$, $G_{ST,stor}$, $G_{TS,stor}$, and $G_{TT,stor}$. If the subset of lines S is active and T is inactive, the compensation matrix $\Omega$ would also have a block structure, including a non-zero sub-matrix $\Omega_{SS}$ for compensating crosstalk between active lines, and three zero sub-matrices $\Omega_{ST}$, $\Omega_{TS}$, and $\Omega_{TT}$.

The precoder implements a precoder matrix that cancels crosstalk among the active lines using a matrix of the compensation coefficients associated with the current active lines and an identity matrix. In the example where S is the active subset of lines, the precoder matrix includes a sub-matrix $C_{SS} = I + \Omega_{SS}$ and three zero sub-matrices.

The processor 310 estimates any unknown elements of the channel matrix G when a line joins for the first time, and stores them for later use. The stored channel matrix $G_{stor}$ includes sub-matrices having channel coefficients corresponding to inactive lines, if those lines were active previously. The processor 310 updates the compensation matrix $\Omega$ whenever lines activate or deactivate.

Alternatively, the memory 312 stores a combined channel and compensation matrix A. The combined channel and compensation matrix A may be referred to as the first matrix in this embodiment. Submatrices pertaining only to the set of active lines contain a sub-matrix of the current compensation matrix associated with the active lines. All other sub-matrices of the combined matrix contain estimates $G_{stor}$ of the associated channel matrix G. In other words, the combined matrix A only includes the compensation sub-matrix (or submatrices) having rows and columns associated with subsets of active lines and channel sub-matrices having rows and/or columns associated with subsets of inactive lines.

At S410, the processor 310 receives an indication from the subset selector that at least one additional line is to become active. The indication indicates which of the lines are to become active.

The processor 310 then determines new compensation coefficients based on the stored first matrix and the active compensation coefficients, at S415. The active compensation coefficients are the coefficients $\Omega_{SS}$ stored by the memory 312 before the processor 310 receives the indication.

Figure 5B:
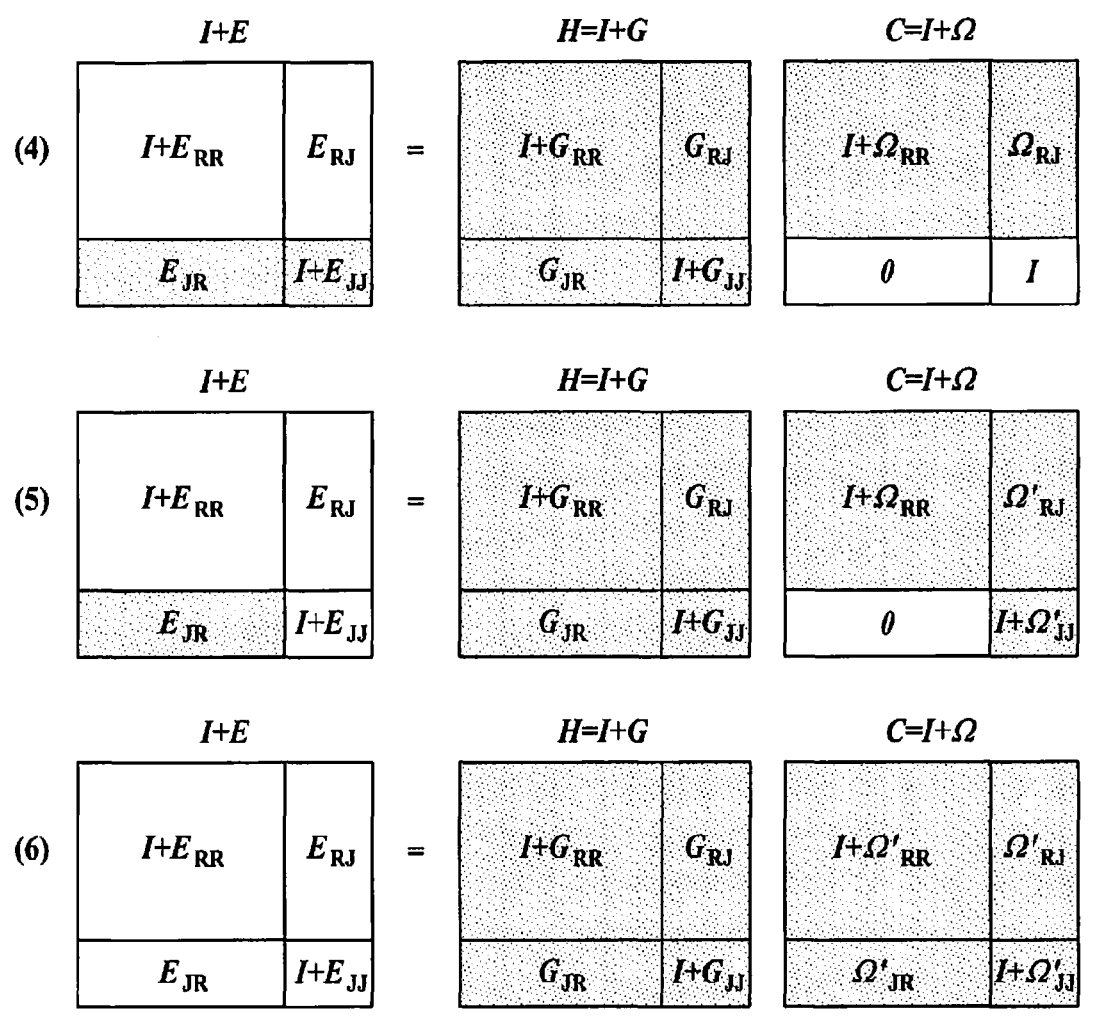

For example, R is a set of active lines before the activation and T is a set of inactive lines before the activation. A subset of lines J in T activates. After the activation, the set of lines S=R∪J will be active. FIGS. 5A-5B illustrate an example embodiment of S415.

Throughout FIG. 5A, for simplicity, only submatrices corresponding to lines in the set S=R∪J are illustrated. Submatrices corresponding to lines that are not active either before or after the activation procedure do not change during the activation procedure and thus are not shown.

Step (1) in FIG. 5A illustrates the normalized crosstalk channel and precoder matrix before J activates. Residual crosstalk $E_{RR}$ is close to zero because $I+\Omega_{RR}$ is close to $(I+G_{RR})^{-1}$. At least one of the normalized crosstalk channel H and channel matrix G may be stored by the memory 312. The precoder matrix includes the sub-matrix $I+\Omega_{RR}$ to compensate for the crosstalk between the active lines in set R.

Pilot signals are then transmitted on the lines of set J as shown in step (2) of FIG. 5A. The precoder matrix submatrix $C_{JJ}$ becomes equal to identity at this time, and as a result, the residual crosstalk from lines in J into lines in R is $E_{RJ}=G_{RJ}$. The processor 310 estimates the residual crosstalk $E_{RJ}$ by collecting error feedback on lines in set R; this estimate is denoted $E_{RJ,est}$. In G.vector, the pilot symbols are sent only during sync symbols, so that crosstalk from lines in the set J do not interfere with data symbols received on lines in the set R.

In an example embodiment, a difference between the estimated residual crosstalk $E_{RJ,est}$ and the stored channel estimate $G_{RJ,stor}$, may be used by the system as a guide to determine whether to proceed with using the stored values $G_{JR,stor}$ and $G_{JJ,stor}$ to determine the new compensation coefficients in later steps. Throughout, "est" indicates an estimate obtained via error feedback. For example, if the norm of the difference $\|E_{RJ,est}-G_{RJ,stor}\|$, is above a threshold, then there is a larger likelihood that the stored information to be used is not accurate.

As shown in step (3) of FIG. 5A, the processor 310 determines the coefficients for the precoder to implement:

$$\Omega_{RJ}=-(I+\Omega_{RR})E_{RJ,est} \quad (6)$$

to cancel crosstalk from the set J into the set R. Once these coefficients are applied, $E_{RJ}$ becomes close to zero, and $E_{RR}$ remains close to zero, so the system is able to send normal initialization and data signals on lines of the set J without disturbing lines in the set R.

At step (4), shown in FIG. 5B, the lines in the set J go through a channel discovery phase of initialization, establishing two-way communication on the lines in the set J. Subsequently, the processor 310 may receive error feedback from the lines in the set J, during the O-P-VECTOR-2 phase of G.vector initialization. However, according to at least one example embodiment, to reduce the initialization time, error feedback is not collected, and instead the processor 310 computes the residual crosstalk matrices $E_{JR,comp}$ and $E_{JJ,comp}$ based on the stored channel submatrices. More specifically, the processor 310 computes the residual crosstalk matrices $E_{JR,comp}$ and $E_{JJ,comp}$ as:

$$E_{JJ,comp}=G_{JJ,stor}+G_{JR,stor}\Omega_{RJ} \quad (7)$$

$$E_{JR,comp}=G_{JR,stor}+G_{JR,stor}\Omega_{RR} \quad (8)$$

Having computed the residual crosstalk matrix $E_{JJ,comp}$, the processor 310 reduces/eliminates crosstalk among the lines in the set J by multiplying the columns of the precoder matrix C associated with the set J by the matrix $I-E_{JJ,comp}$. Consequently, the new compensation coefficients become:

$$\Omega'_{JJ}=E_{JJ,comp} \quad (9)$$

$$\Omega'_{RJ}=\Omega_{RJ}(I-E_{JJ,comp}) \quad (10)$$

When the new compensation coefficients $\Omega'_{JJ}$ and $\Omega'_{RJ}$ are applied (step 5), the residual crosstalk matrix $E_{JJ}$ is reduced to approximately zero while $E_{RJ}$ is maintained close to zero.

The processor 310 next uses the determined values of $E_{JR,comp}$ to update the columns of the precoder matrix C associated with the set R according to:

$$\Omega'_{JR}=-(I+\Omega'_{JJ})E_{JR,comp} \quad (11)$$

$$\Omega'_{RR}=\Omega_{RR}-\Omega'_{RJ}E_{JR,comp} \quad (12)$$

When the new compensation coefficients $\Omega'_{JR}$ and $\Omega'_{RR}$ are applied (step 6 in FIG. 5B), the residual crosstalk matrix $E_{JR}$ is reduced approximately zero while $E_{RR}$ is maintained close to zero. At this point, the entire residual crosstalk submatrix $E_{SS}$ is approximately zero, meaning that crosstalk among lines in the new active set is being compensated correctly.

Figure 6A:
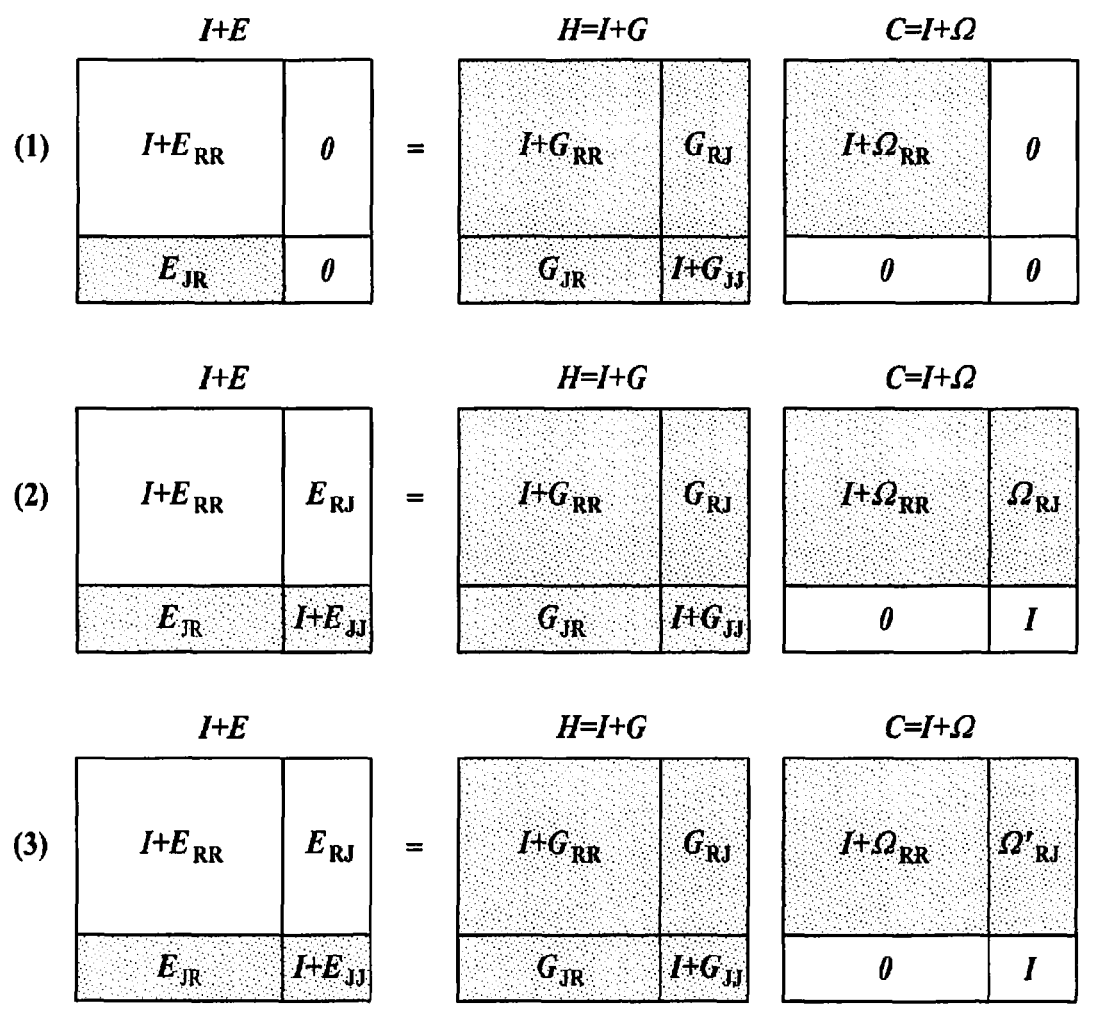

FIGS. 6A-6B illustrate another example embodiment of S415. The example embodiment shown in FIGS. 6A-6B are similar to the embodiment described in FIGS. 5A-5B. Therefore, only the differences will be described, for the sake of brevity.

At step (2) in FIG. 6A, the processor 310 uses the stored values of the channel matrix $G_{stor}$ to set:

$$\Omega_{RJ}=-(I+\Omega_{RR})G_{RJ,stor} \quad (13)$$

before sending pilot signals to estimate $E_{RJ}$. If the stored values are accurate ($G_{RJ,stor}$ is close to $G_{RJ}$) and the active compensation coefficients $\Omega_{RR}$ are within a threshold variance (close to $(I+G_{RR})^{-1}-I$), then the residual crosstalk $E_{RJ}$ will already be close to zero. In some implementations, this results in a more accurate estimate $E_{RJ,est}$ than is obtained with the method described in FIG. 5A-5B, where $E_{RJ}$ can be large.

At step (3) in FIG. 6A, the processor 310 refines the precoder coefficients as:

$$\Omega'_{RJ}=\Omega_{RJ}-(I+\Omega_{RR})E_{RJ,est} \quad (14)$$

to further cancel residual crosstalk from the set J into the set R. Subsequent steps of FIG. 6A-6B are carried out as described for corresponding steps of FIG. 5A-5B.

Once the active compensation coefficients are determined to include the newly activated lines, the system applies the new compensation coefficients to data to be transmitted.

Deactivation

Figure 7:
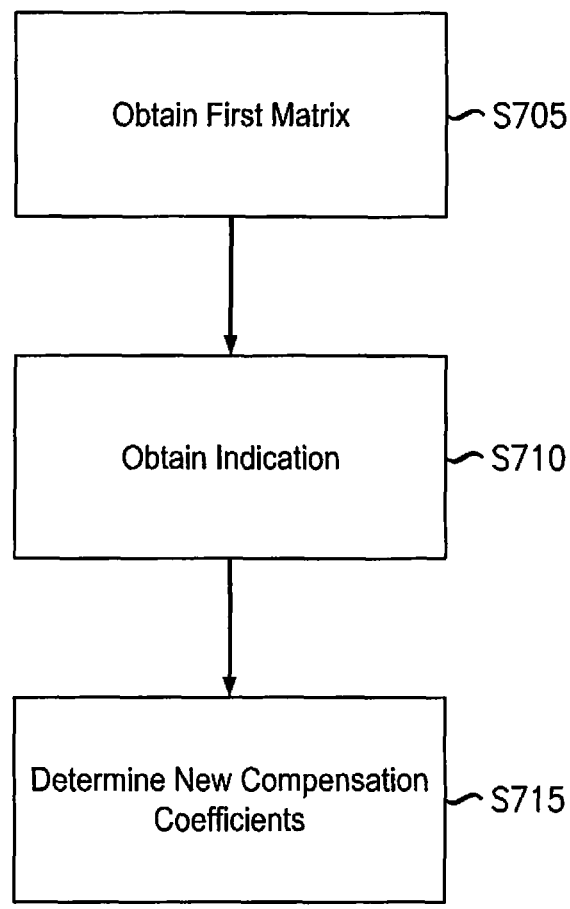

FIG. 7 illustrates a method of deactivating a subset of communication paths in a system. To aid in the description of the method of FIG. 7, FIG. 3 is used. However, it should be understood that the method of FIG. 7 may be performed by controllers and precoders different that those described in FIG. 3.

At S705, the system obtains a first matrix. Step S705 is the same as S405. Therefore, for the sake of brevity, S705 will not be described in further detail.

At S710, the processor 310 receives an indication that at least one line that is currently active is to become inactive.

The processor 310 then determines new compensation coefficients based on the stored first matrix and the active compensation coefficients, at S715.

For example, the memory 312 stores active channel matrix $G_{SS,stor}$ with partition:

$$G_{SS}=\begin{bmatrix} G_{RR,stor} & G_{RD,stor} \\ G_{DR,stor} & G_{DD,stor} \end{bmatrix} \quad (15)$$

where S={R union D} are the active lines, where D is the set of lines that are to deactivate, and R is the set of lines that will remain active.

The processor 310 receives an indication that lines in subset D are going to deactivate.

The inverse precoder $\Omega_{SS}$ satisfies (approximately):

$$(I+G_{SS})(I+\Omega_{SS})\approx I \quad (16)$$

Therefore, memory 312 stores the following submatrix of the compensation matrix or combined channel/compensation matrix:

$$\Omega_{SS} = \begin{bmatrix} \Omega_{RR} & \Omega_{RD} \\ \Omega_{DR} & \Omega_{DD} \end{bmatrix} \quad (17)$$

During a leaving event, the processor 310 computes a new, reduced inverse precoder sub-matrix:

$$\Omega_{RR}' = (I + G_{RR})^{-1} - I \quad (18)$$

In the combined matrix embodiment in which the memory 312 stores the combined matrix A, the processor 310 also computes and stores estimates of channel submatrices $G_{RD,stor}$, $G_{DR,stor}$, and $G_{DD,stor}$. In the two-matrix embodiment in which the memory 312 separately stores the channel matrix $G_{stor}$ and the compensation matrix $\Omega$, the processor does not perform these computations because submatrices $G_{RD,stor}$, $G_{DR,stor}$, and $G_{DD,stor}$ are already stored in the memory 312.

In the combined matrix embodiment, when the memory 312 stores the combined matrix A, the new precoder $\Omega_{RR}'$ and the channel submatrices $G_{RD,stor}$, $G_{DR,stor}$, and $G_{DD,stor}$ are stored in the array $A_{SS}$ by the memory 312 in place of the old precoder coefficients $\Omega_{SS}$. In this way, the portion of A corresponding to the new active set R consists of precoder coefficients, and the portion of A corresponding to the new inactive set {T union D} consists of channel coefficients. In the two-matrix embodiment, the new precoder $\Omega_{RR}'$ is stored in the compensation matrix, and the submatrices $\Omega_{RD}$, $\Omega_{DR}$, and $\Omega_{DD}$ are set to zero.

The exact formulas for the new submatrices are as follows:

$$\Omega_{RR}' \approx \Omega_{RR} - \Omega_{RD}(1+\Omega_{DD})^{-1}\Omega_{DR}$$

$$G_{DD,stor} = (I+\Omega_{DD}-\Omega_{DR}(I+\Omega_{RR})^{-1}\Omega_{RD})^{-1} - I$$

$$G_{DR,stor} = -(I+\Omega_{DD})^{-1}\Omega_{DR}(I+\Omega_{RR}-\Omega_{RD}(I+\Omega_{DD})^{-1}\Omega_{DR})^{-1}$$

$$G_{RD,stor} = -(I+\Omega_{RR})^{-1}\Omega_{RD}(I+\Omega_{DD}-\Omega_{DR}(I+\Omega_{RR})^{-1}\Omega_{RD})^{-1} \quad (19)$$

These expressions can be simplified using first order approximations for matrix inverses. The overall approximation obtained is second order.

$$\Omega_{RR}' = \Omega_{RR} - \Omega_{RD}(I-\Omega_{DD})\Omega_{DR}$$

$$G_{DD,stor} = -\Omega_{DD} + \Omega_{DR}(I-\Omega_{RR})\Omega_{RD}$$

$$G_{DR,stor} = -(I-\Omega_{DD})\Omega_{DR}(I-\Omega_{RR}+\Omega_{RD}(I-\Omega_{DD})\Omega_{DR})$$

$$G_{RD,stor} = -(I-\Omega_{RR})\Omega_{RD}(I-\Omega_{DD}+\Omega_{DR}(I-\Omega_{RR})\Omega_{RD}) \quad (20)$$

The expressions for $\Omega_{RR}'$ and $G_{DD,stor}$ in the display above can be computed first, and then used in the subsequent computations for $G_{DR,stor}$ and $G_{RD,stor}$. Then the expressions for $G_{DR,stor}$ and $G_{RD,stor}$ are:

$$G_{DR,stor} = -(1-\Omega_{DD})\Omega_{DR}(1-\Omega_{RR}')$$

$$G_{RD,stor} = -(1-\Omega_{RR})\Omega_{RD}(1+G_{DD,stor}) \quad (21)$$

Once the active compensation coefficients are determined to include the newly inactive lines, the system applies the new compensation coefficients to data to be transmitted.

Upstream

While the above described embodiments are described with reference to determining precoder coefficients, it should be understood that similar methods may be applied to determine postcoder coefficients.

Figure 8:
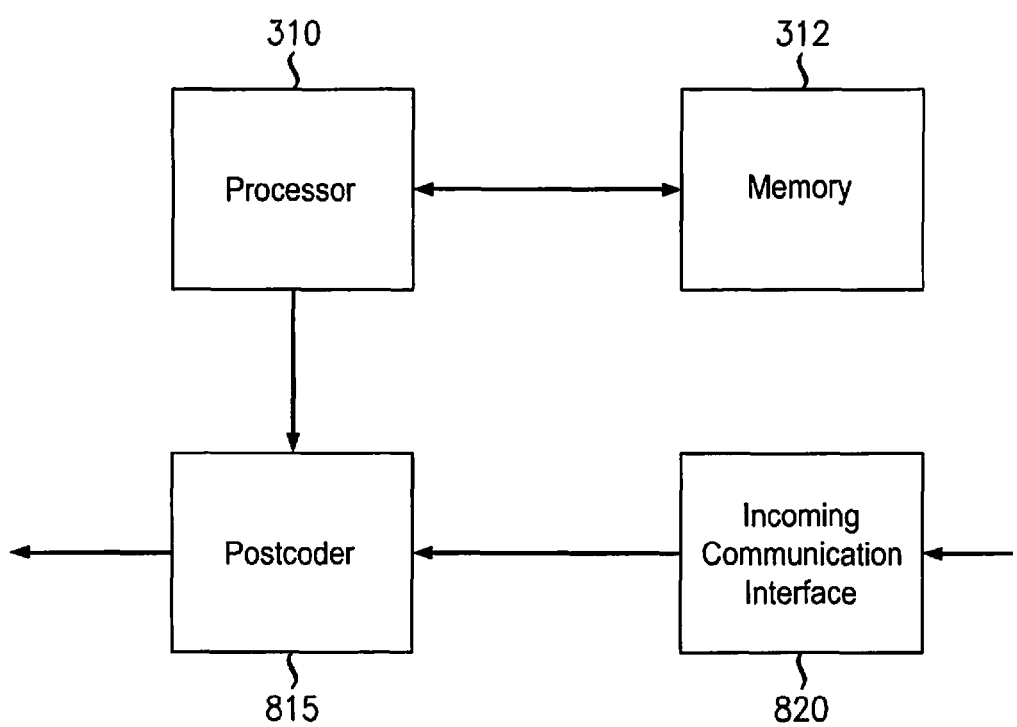

For example, FIG. 8 illustrates a portion of the controller 222 for processing upstream communications. As shown, the controller 222 has a communication interface 820 to receive symbol data from the CPEs $250_1$-$250_n$. The communication interface 820 forwards the symbol data to a postcoder 815. The postcoder 815 applies a postcoder matrix (I+$\Omega_{UP}$) to obtain post-coded symbol data. The subscript "UP" is used to identify a matrix used to remove crosstalk on the upstream.

As described above, the processor 310 is configured to store to and retrieve data from the memory (storage medium) 312, such as the historical channel matrix.

The communication interface 820 and postcoder 815 may be implemented in hardware, software or firmware, for example. If either one of the communication interface 820 and postcoder 815 is software, a controller such as the controller 222 is specifically programmed to execute the software.

Figure 9:
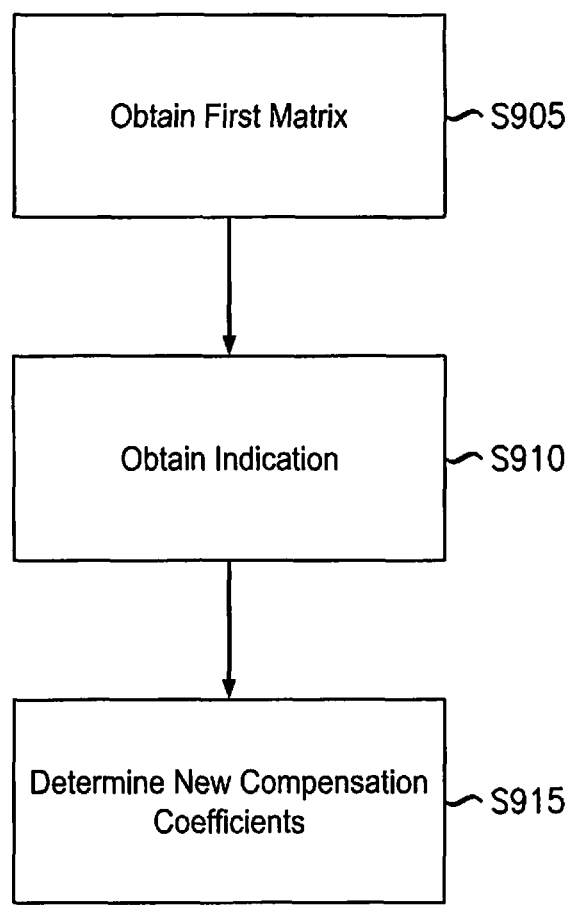

FIG. 9 illustrates a method of determining postcoder coefficients. As should be understood and will be described, the method of FIG. 9 may be performed during activation and deactivation of lines. To aid in the description of the method of FIG. 9, FIG. 8 is used. However, it should be understood that the method of FIG. 9 may be performed by controllers and postcoders different that those described in FIG. 8.

At S905, the system obtains a first matrix. For example, the memory 312 stores the estimated channel matrix $G_{stor}$ and compensation matrix $\Omega_{UP}$.

The postcoder implements a postcoder matrix that cancels crosstalk among the active lines using a matrix of the compensation coefficients associated with the current active lines and an identity matrix.

Alternatively, the memory 312 stores a combined channel and compensation matrix $A_{UP}$. The combined channel and compensation matrix $A_{UP}$ may be referred to as the first matrix in this embodiment. Submatrices pertaining only to the set of active lines contain a sub-matrix of the current compensation matrix associated with the active lines. All other sub-matrices of the combined matrix contain estimates $G_{stor}$ of the associated channel matrix G. In other words, the combined matrix $A_{UP}$ only includes the compensation sub-matrix (or submatrices) having rows and columns associated with subsets of active lines and channel sub-matrices having rows and/or columns associated with subsets of inactive lines.

At S910, the processor 310 receives an indication from the subset selector that at least one additional line is to become active or inactive. The indication indicates which of the lines are to become active or inactive.

The processor 310 then determines new compensation coefficients based on the stored first matrix and the active postcoder compensation coefficients, at S915. The active compensation coefficients are coefficients $\Omega_{SS,UP}$ stored by the memory 312 before the processor 310 receives the indication.

The processor 310 retrieves the compensation matrix $\Omega_{RR}$, UP and stored channel matrices $G_{JR,stor}$, $G_{RJ,stor}$, and $G_{JJ,stor}$. A new compensation matrix $\Omega'_{SS,UP}$ is then computed.

The processor 310 may obtain diagonal submatrices of $\Omega'_{SS,UP}$ as follows:

$$\Omega'_{JJ,up} = (I+G_{JJ,stor} - G_{JR,stor}(I+\Omega_{RR,up})G_{RJ,stor})^{-1} - I$$

$$\Omega'_{RR,up} = ((I+\Omega_{RR,up})^{-1} - G_{RJ,stor}(I+G_{JJ,stor})^{-1}G_{JR,stor})^{-1} - I \quad (22)$$

The processor 310 then obtains the off-diagonal blocks as:

$$\Omega'_{JR,UP} = -(I+\Omega'_{JJ,UP})G_{JR,stor}(I+\Omega_{RR,UP})$$

$$\Omega'_{RJ,UP} = -(I+\Omega'_{RR,UP})G_{RJ,stor}(I+G_{JJ,stor})^{-1} \quad (23)$$

These expressions can be simplified using first order approximations for matrix inverses, or other similar approximations, as follows:

$$\Omega'_{JJ,UP} = -G_{JJ,stor} + G_{JR,stor}(I+\Omega_{RR,UP})G_{RJ,stor}$$

$$\Omega'_{RR,UP} = \Omega_{RR,UP} + G_{RJ,stor}(I-G_{JJ,stor})G_{JR,stor} \quad (24)$$

followed by:

$$\Omega'_{JR,UP} = -(I+\Omega'_{JJ,UP})G_{JR,stor}(I+\Omega_{RR,UP})$$

$$\Omega'_{RJ,UP} = -(I+\Omega'_{RR,UP})G_{RJ,stor}(I-G_{JJ,stor}). \quad (25)$$

Once the new compensation matrix is applied, crosstalk between all lines in S={R union J} is eliminated/reduced. Hence, transmission of initialization and data signals on lines in set J can proceed without any need for sending pilot signals or collecting error feedback.

Equations (22)-(25) may also be used for downstream activation by replacing the postcoder coefficients in the equations with precoder coefficients for the corresponding active lines.

In contrast to the downstream activation described with reference to FIGS. 4-6B, no feedback is used in the activation procedure described with reference to FIGS. 8-9. Because feedback is not used in equations (22)-(25), an activation procedure may result in increased interference on the already active lines, if the stored coefficients are not accurate.

Consequently, the activation described with reference to FIGS. 4-6B acts as an intermediate between activation without feedback and G.vector. Because feedback is only used once (e.g., step (3) in FIG. 5A), the methods described with reference to FIGS. 4-6B are faster than G.vector activation, which requires feedback at two different steps.

It should be understood that for deactivation in the upstream, the same methods may be applied as described in the downstream case for deactivation.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of initializing a subset of communication paths in a system, the method comprising:
   obtaining a first matrix from a storage medium, the first matrix including at least one channel sub-matrix of the system associated with a subset of the plurality of communication paths;
   obtaining an indication of which communication paths are to become active; and
   determining, after the obtaining the indication, new compensation coefficients based on the at least one channel sub-matrix and active compensation coefficients, the active compensation coefficients for compensating for crosstalk between active communication paths prior to a number of active communication paths changing and the new compensation coefficients for compensating for crosstalk between the changed number of active communication paths.

2. The method of claim 1, wherein the at least one channel sub-matrix includes channel coefficients corresponding to communication paths that were inactive before the obtaining.

3. The method of claim 1, wherein the first matrix further includes,
   a compensation sub-matrix, the compensation sub-matrix including the active compensation coefficients.

4. The method of claim 3, wherein the first matrix only includes the compensation sub-matrix having rows and columns associated with subsets of active communication paths before the obtaining and channel sub-matrices having at least one of rows and columns associated with subsets of inactive communication paths before the obtaining.

5. The method of claim 1, further comprising:
   updating the at least one channel sub-matrix.

6. The method of claim 1, further comprising:
   obtaining a second matrix before the determining if the number of active communication paths changes, the second matrix including a compensation sub-matrix, the compensation sub-matrix including the active compensation coefficients.

7. The method of claim 1, wherein the first matrix includes a plurality of channel sub-matrices associated with subsets of the plurality of communication paths.

8. The method of claim 7, further comprising:
   maintaining the first matrix when the number of active communication paths in the system changes.

9. The method of claim 1, further comprising:
   transmitting data using the new compensation coefficients.

10. A method of deactivating a subset of communication paths in a system, the method comprising:
    obtaining a first matrix from a storage medium, the first matrix including active compensation sub-matrices associated with at least first and second subsets of active communication paths in the system, the active compensation sub-matrices representing compensation coefficients for compensating for crosstalk in the system;
    obtaining an indication of which communication paths are to become inactive; and
    determining, after the obtaining the indication, new compensation coefficients and a plurality of channel sub-matrices of the system based on the active compensation sub-matrices, the new compensation coefficients for compensating for crosstalk between active communication paths which remain active.

11. The method of claim 10, further comprising:
    deactivating the second subset of communication paths.

12. The method of claim 11, wherein the determining includes determining the new compensation coefficients and the plurality of channel sub-matrices as:

$$\Omega_{RR}' \approx \Omega_{RR} - \Omega_{RD}(1+\Omega_{DD})^{-1}\Omega_{DR}$$

$$G_{DD,stor} = (I+\Omega_{DD} - \Omega_{DR}(I+\Omega_{RR})^{-1}\Omega_{RD})^{-1} - I$$

$$G_{DR,stor} = -(I+\Omega_{DD})^{-1}\Omega_{DR}(I+\Omega_{RR} - \Omega_{RD}(I+\Omega_{DD})^{-1}\Omega_{DR})^{-1}$$

$$G_{RD,stor} = -(I+\Omega_{RR})^{-1}\Omega_{RD}(I+\Omega_{DD} - \Omega_{DR}(I+\Omega_{RR})^{-1}\Omega_{RD})^{-1}$$

wherein R is the first subset and D is the second subset, $G_{DD}$, $G_{DR}$ and $G_{RD}$ are channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

13. The method of claim 10, wherein the determining includes determining the new compensation coefficients and the plurality of channel sub-matrices as:

$$\Omega_{RR}' = \Omega_{RR} - \Omega_{RD}(I-\Omega_{DD})\Omega_{DR}$$

$$G_{DD,stor} = -\Omega_{DD} + \Omega_{DR}(I-\Omega_{RR})\Omega_{RD}$$

$$G_{DR,stor} = -(I-\Omega_{DD})\Omega_{DR}(I-\Omega_{RR} + \Omega_{RD}(I-\Omega_{DD})\Omega_{DR})$$

$$G_{RD,stor} = -(I-\Omega_{RR})\Omega_{RD}(I-\Omega_{DD} + \Omega_{DR}(I-\Omega_{RR})\Omega_{RD})$$

wherein R is the first subset and D is the second subset, $G_{DD}$, $G_{DR}$ and $G_{RD}$ are channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

14. The method of claim 10, further comprising:
transmitting data using the new compensation coefficients.

15. A system having a plurality of communication paths, the system comprising:
a memory configured to store a first matrix, the first matrix including at least one channel sub-matrix of the system associated with a subset of the plurality of communication paths; and
a processor, the processor configured to,
obtain an indication of which communication paths are to become active, and
determine, after obtaining the indication, new compensation coefficients based on the stored at least one channel sub-matrix and active compensation coefficients, the active compensation coefficients for compensating for crosstalk between active communication paths prior to a number of active communication paths changing and the new compensation coefficients for compensating for crosstalk between the changed number of active communication paths.

16. The system of claim 15, wherein the at least one channel sub-matrix includes channel coefficients corresponding to inactive communication paths before obtaining the indication.

17. The system of claim 15, wherein the first matrix further includes,
a compensation sub-matrix, the compensation sub-matrix including the active compensation coefficients.

18. The system of claim 17, wherein the first matrix only includes the compensation sub-matrix having rows and columns associated with subsets of active communication paths before obtaining the indication and channel sub-matrices having at least one of rows and columns associated with subsets of inactive communication paths before obtaining the indication.

19. The system of claim 15, wherein the processor is configured to,
update the at least one channel sub-matrix.

20. The system of claim 15, wherein the memory is configured to,
store a second matrix, the second matrix including a compensation sub-matrix, the compensation sub-matrix including the active compensation coefficients.

21. The system of claim 15, wherein the first matrix includes a plurality of channel sub-matrices associated with subsets of the plurality of communication paths.

22. The system of claim 21, wherein the memory is configured to,
maintain the first matrix when the number of active communication paths in the system changes.

23. A system having a plurality of communication paths, the system comprising:
a memory configured to store a first matrix, the first matrix including active compensation sub-matrices associated with at least first and second subsets of active communication paths in the system, the active compensation sub-matrices representing compensation coefficients for compensating for crosstalk in the system; and
a processor configured to,
obtain an indication of which communication paths are to become inactive, and
determine, after obtaining the indication, new compensation coefficients and a plurality of channel sub-matrices of the system based on the stored active compensation sub-matrices, the new compensation coefficients for compensating for crosstalk between active communication paths which remain active.

24. The system of claim 23, wherein the processor is configured to,
deactivate the second subset of communication paths.

25. The system of claim 24, wherein the processor is configured to determine the new compensation coefficients and the plurality of channel sub-matrices as:

$$\Omega_{RR}' = \Omega_{RR} - \Omega_{RD}(I+\Omega_{DD})^{-1}\Omega_{DR}$$

$$G_{DD,stor} = (I+\Omega_{DD}-\Omega_{DR}(I+\Omega_{RR})^{-1}\Omega_{RD})^{-1}-I$$

$$G_{DR,stor} = -(I+\Omega_{DD})^{-1}\Omega_{DR}(I+\Omega_{RR}-\Omega_{RD}(I+\Omega_{DD})^{-1}\Omega_{DR})^{-1}$$

$$G_{RD,stor} = -(I+\Omega_{RR})^{-1}\Omega_{RD}(I+\Omega_{DD}-\Omega_{DR}(I+\Omega_{RR})^{-1}\Omega_{RD})^{-1}$$

wherein R is the first subset and D is the second subset, $G_{DD}$, $G_{DR}$ and $G_{RD}$ are channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

26. The system of claim 24, wherein the processor is configured to determine the new compensation coefficients and the plurality of channel sub-matrices as:

$$\Omega_{RR}' = \Omega_{RR} - \Omega_{RD}(I-\Omega_{DD})\Omega_{DR}$$

$$G_{DD,stor} = -\Omega_{DD} + \Omega_{DR}(I-\Omega_{RR})\Omega_{RD}$$

$$G_{DR,stor} = -(I-\Omega_{DD})\Omega_{DR}(I-\Omega_{RR}+\Omega_{RD}(I-\Omega_{DD})\Omega_{DR})$$

$$G_{RD,stor} = -(I-\Omega_{RR})\Omega_{RD}(I-\Omega_{DD}+\Omega_{DR}(I-\Omega_{RR})\Omega_{RD})$$

wherein R is the first subset and D is the second subset, $G_{DD}$, $G_{DR}$ and $G_{RD}$ are channel sub-matrices, $\Omega_{RR}$, $\Omega_{RD}$, $\Omega_{DR}$, $\Omega_{DD}$ are active compensation sub-matrices, $\Omega_{RR}'$ is a new compensation sub-matrix including the new compensation coefficients and I is an identity matrix.

* * * * *